United States Patent
Hasselbusch et al.

(10) Patent No.: US 6,364,438 B1
(45) Date of Patent: Apr. 2, 2002

(54) PRESS FIT ROLLER ASSEMBLIES OF AN UNDERCARRIAGE ASSEMBLY OF A WORK MACHINE AND METHOD OF MAKING THE SAME

(75) Inventors: Michael D. Hasselbusch, Metamora; Roy L. Maguire, Edelstein, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/553,544

(22) Filed: Apr. 20, 2000

(51) Int. Cl.[7] .................. B60B 17/00; B62D 55/14; B25G 3/28; F16J 15/16
(52) U.S. Cl. .................. 305/136; 305/139; 305/135; 403/359.6; 277/912
(58) Field of Search .................. 403/288, 359.1, 403/359.6; 277/345, 907, 910, 912; 305/100, 124, 125, 129, 135, 136, 137, 138, 139, 199, 131, 132, 133, 134, 142, 194, 195

(56) References Cited

U.S. PATENT DOCUMENTS

| | | |
|---|---|---|
| 2,823,079 A | 2/1958 | Williams |
| 2,877,059 A | 3/1959 | Williams |
| 2,915,346 A | 12/1959 | Stallman |
| 2,926,968 A | 3/1960 | Toth |
| 2,990,220 A | 6/1961 | Malone |
| 3,489,471 A | 1/1970 | Kelley |
| 3,773,393 A | 11/1973 | Story et al. |
| 3,843,214 A | 10/1974 | Piepho |
| 3,871,719 A | 3/1975 | Boggs |
| 3,910,128 A * | 10/1975 | Boggs et al. ............... 305/136 |
| 3,945,693 A | 3/1976 | Booth, Jr. et al. |
| 4,371,362 A * | 2/1983 | Dorris ............... 305/136 |
| 4,640,559 A | 2/1987 | Crotti |
| 4,695,102 A | 9/1987 | Crotti |
| 4,836,318 A | 6/1989 | Tonsor et al. |
| 4,993,133 A | 2/1991 | Goeserich |
| 5,040,855 A | 8/1991 | Diekevers |
| 5,302,012 A * | 4/1994 | Dester et al. ............... 305/136 |
| 5,553,931 A | 9/1996 | Diekevers |
| 5,647,643 A | 7/1997 | Noble |
| 5,647,683 A | 7/1997 | Easley |
| 5,706,580 A | 1/1998 | Ohtusuki et al. |
| 5,803,558 A | 9/1998 | Ketting et al. |
| 5,829,888 A | 11/1998 | Bhargava et al. |
| 5,884,982 A | 3/1999 | Yemini |

FOREIGN PATENT DOCUMENTS

JP 2-68273 A * 3/1990 ............... 305/136

* cited by examiner

*Primary Examiner*—S. Joseph Morano
*Assistant Examiner*—Jason R. Bellinger
(74) *Attorney, Agent, or Firm*—Bradford G. Addison; Thomas L. Derry

(57) ABSTRACT

A roller assembly for an undercarriage of a work machine has a roller rim having central passage defined therein with (i) a first end of the central passage of the roller rim defining a first access opening, and (ii) a second end of the central passage of the roller rim defining a second access opening. The roller assembly also has a roller shaft having a first end portion which is positioned outside of the central passage of the roller rim and a second end portion which is positioned within the central passage of the roller rim, the second end portion of the roller shaft having an outwardly extending annular flange secured thereto. Yet further, the roller assembly has a retainer press fit into the second access opening. In addition, the roller assembly has an axial thrust bearing interposed between the outwardly extending annular flange of the roller shaft and the retainer. A method for manufacturing a roller assembly of an undercarriage assembly is also disclosed.

16 Claims, 12 Drawing Sheets

PRESS FIT ROLLER ASSEMBLIES OF AN UNDERCARRIAGE ASSEMBLY OF A WORK MACHINE AND METHOD OF MAKING THE SAME

TECHNICAL FIELD

The present invention relates generally to a roller assembly of an undercarriage of a work machine, and more particularly to press fit roller assemblies of an undercarriage assembly of a work machine and method of making the same.

BACKGROUND ART

A work machine, such as a track-type tractor or excavator, is typically supported and propelled by a pair of undercarriage assemblies, each one of which includes an endless drive track chain having a plurality of interconnected articulating components or links. The undercarriage assembly typically also includes a drive sprocket, one or more idler wheels, a number of lower track rollers, and a carrier roller around each of which the drive track chain is entrained or otherwise advanced.

Over time as a result of extended operation of the work machine, a number of the components associated with the undercarriage assembly, such as the idler rollers, the track rollers, and the carrier roller begin to wear thereby necessitating repair thereof. However, repair of such components is often impractical since heretofore designed idler rollers, track rollers, and carrier rollers are generally mechanically complex thereby creating undesirable amounts of machine downtime during periods of repair. One such heretofore designed carrier roller is shown in U.S. Pat. No. 4,695,102 issued to Crotti. The carrier roller disclosed in Crotti, amongst other things, includes roller bearing assemblies for absorbing radial and axial thrust loads. However, use of such roller bearing assemblies adds to the mechanical complexity of the carrier roller thereby increasing the cost and time associated with repair thereof.

In an effort to avoid the complexity and cost associated with repair of idler rollers, track rollers, and carrier rollers, certain manufactures have chosen to make such components "disposable". In other words, when the component has worn to the point of needing repair, the idler roller, track rollers, or carrier roller is removed from the work machine and thereafter discarded. Thereafter, a replacement idler roller, track roller, or carrier roller is then installed on the machine. It should be appreciated that in the case of when a component is designed to be disposed, in lieu of repaired, it is even more desirable to produce the component in a cost efficient manner thereby reducing operation costs associated with the work machine.

What is needed therefore are undercarriage components which overcome one or more of the above-mentioned drawbacks. What is also needed are undercarriage components which are less mechanically complex relative to heretofore designed components. What is moreover needed is a method of manufacturing undercarriage components which is less expensive and less complex relative to heretofore utilized manufacturing methods.

DISCLOSURE OF THE INVENTION

In accordance with one embodiment of the present invention, there is provided a roller assembly for an undercarriage of a work machine. The roller assembly has a roller rim having central passage defined therein with (i) a first end of the central passage of the roller rim defining a first access opening, and (ii) a second end of the central passage of the roller rim defining a second access opening. The roller assembly also has a roller shaft having a first end portion which is positioned outside of the central passage of the roller rim and a second end portion which is positioned within the central passage of the roller rim, the second end portion of the roller shaft having an outwardly extending annular flange secured thereto. Yet further, the roller assembly has a retainer press fit into the second access opening. In addition, the roller assembly has an axial thrust bearing interposed between the outwardly extending annular flange of the roller shaft and the retainer.

In accordance with another embodiment of the present invention, there is provided a method of manufacturing a roller assembly for an undercarriage assembly of a work machine, with the roller assembly having (i) a roller rim which has central passage defined therein, with a first end of the central passage of the roller rim defining a first access opening and a second end of the central passage of the roller rim defining a second access opening, (ii) a roller shaft having a first end portion and a second end portion, the second end portion having an outwardly extending annular flange secured thereto, (iii) a retainer, and (iv) a thrust bearing. The method has the step of advancing the first end portion of the roller shaft through the second access opening of the central passage and out the first access opening of the central passage such that (i) the first end portion of the roller shaft extends out of the first access opening of the central passage, and (ii) the second end portion of the roller shaft is positioned in the central passage. The method also has the step of advancing the thrust bearing through the second access opening. Moreover, the method has the step of press fitting the retainer into the second access opening such that the thrust bearing is interposed between the retainer and the outwardly extending annular flange of the roller shaft.

In accordance with yet another embodiment of the present invention, there is provided a roller assembly for an undercarriage of a work machine. The roller assembly has a roller rim having a central passage defined therein with (i) a first end of the central passage of the roller rim defining a first access opening, and (ii) a second end of the central passage of the roller rim defining a second access opening. The roller assembly also has a roller shaft positioned in the central passage, the roller shaft having a first end portion which extends out of the first access opening of the central passage and a second end portion which extends out of the second access opening of the central passage. Moreover, the roller assembly has a first retainer press fit into the first access opening of the roller rim. The roller assembly further has a first collar press fit onto the first end portion of the roller shaft. In addition, the roller assembly has a first seal assembly interposed between the first retainer and the first collar.

BEST MODE FOR CARRYING OUT THE INVENTION

Figure 1:
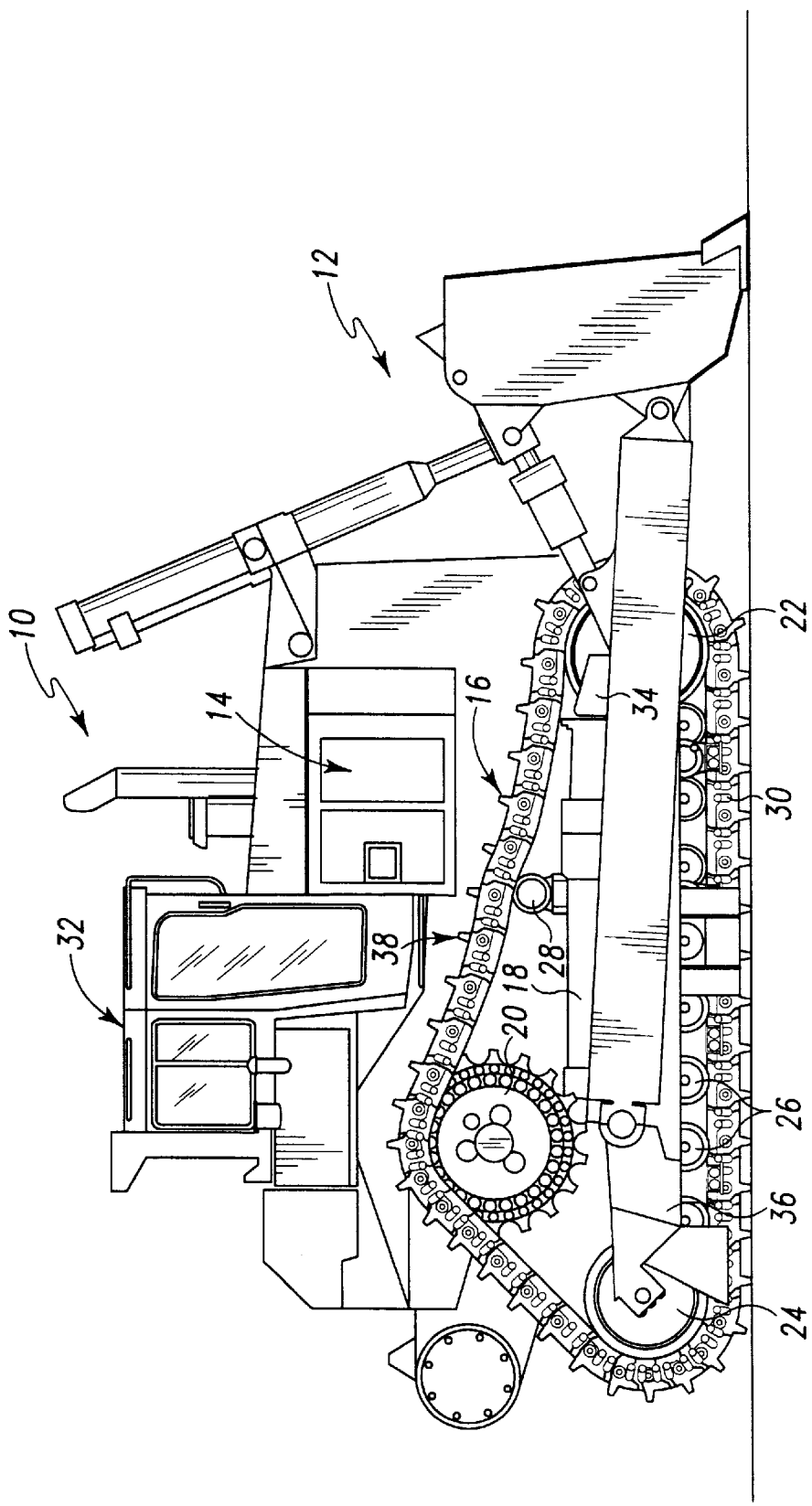
FIG. 1 is a side elevational view of a track-type tractor which incorporates the features of the present invention therein.

Referring to FIG. 1, there is shown a work machine such as a track-type tractor 10 which is utilized to perform numerous work functions such as earth moving. The track-type tractor 10 includes a number of work implements such as a hydraulically-powered blade assembly 12 and may also be equipped with a hydraulically-powered ripper (not shown). The track-type tractor 10 further includes an engine such as a diesel engine 14 for providing the motive power for both advancing the tractor and operating the blade assembly 12.

The track-type tractor 10 also includes an undercarriage assembly 16. The undercarriage assembly 16 includes a frame assembly 18, a drive sprocket 20, a front idler wheel 22, a rear idler wheel 24, a number of lower track rollers 26, and a carrier roller 28. An endless drive track chain 30 is driven by the drive sprocket 20 so as to be advanced around each of the front idler wheel 22, the rear idler wheel 24, the track rollers 26, and the carrier roller 28 thereby providing the motive power for advancing the track-type tractor 10. In particular, mechanical output from the engine 14 is transmitted to the drive sprocket 20 via a transmission assembly (not shown) thereby driving the drive sprocket 20 so as to advance the drive track chain 30 and hence the track-type tractor 10. It should be appreciated that although only one side of the track-type tractor 10 is shown in FIG. 1, the other side of the tractor 10 would also include an undercarriage assembly 16 having similar components as those shown in FIG. 1 (e.g. a frame assembly 18, drive sprocket 20, idler wheels 22, 24, rollers 26, 28, and drive track chain 30).

The track-type tractor 10 also includes a cab 32. The cab 32 is provided to enclose or otherwise house the devices associated with the track-type tractor 10 which are utilized by an operator during operation of the track-type tractor 10. For example, the cab 32 houses an operator seat (not shown) and a control assembly which includes, for example, a steering wheel and foot pedal assembly (not shown).

The frame assembly 18 of the undercarriage assembly 16 includes a front frame member 34 and a rear frame member 36. The front idler wheel 22 is rotatably coupled to the front frame member 34, whereas the rear idler wheel 24 is rotatably coupled to the rear frame member 36. Such a configuration allows for the adjustment of tension on the drive track chain 30. In particular, the front frame member 34 is slidable or otherwise movable relative to the rear frame member 36. Hence, when the front frame member 34 is slid in a direction away from the rear frame member 36, the front idler wheel 22 is advanced in a direction away from the rear idler wheel 24 thereby increasing tension on the drive track chain 30. Conversely, when the front frame member 34 is slid in a direction toward the rear frame member 36, the front idler wheel 22 is advanced in a direction toward the rear idler wheel 24 thereby decreasing tension on the drive track chain 30. An actuator such as a hydraulic cylinder (not shown) is utilized to either automatically or manually maintain a desired amount of tension on the drive track chain 30 by, for example, maintaining the frame members 34, 36 in predetermined positions relative to one another.

The track rollers 26 guide the drive track chain 30 during advancement of the track-type tractor 10. Moreover, the track rollers 26 are provided to support the track-type tractor 10. In particular, each of the track rollers 26 is rotatably coupled to the frame assembly 18 thereby supporting the weight of the tract-type tractor 10.

The carrier roller 28 on the other hand, is provided to support an upper or return portion 38 of the drive track chain 30 as it is advanced between the front idler wheel 22 and the drive sprocket 20. The carrier roller 28 is rotatably coupled to a frame member (not shown) associated with the track-type tractor 10.

Figure 2:
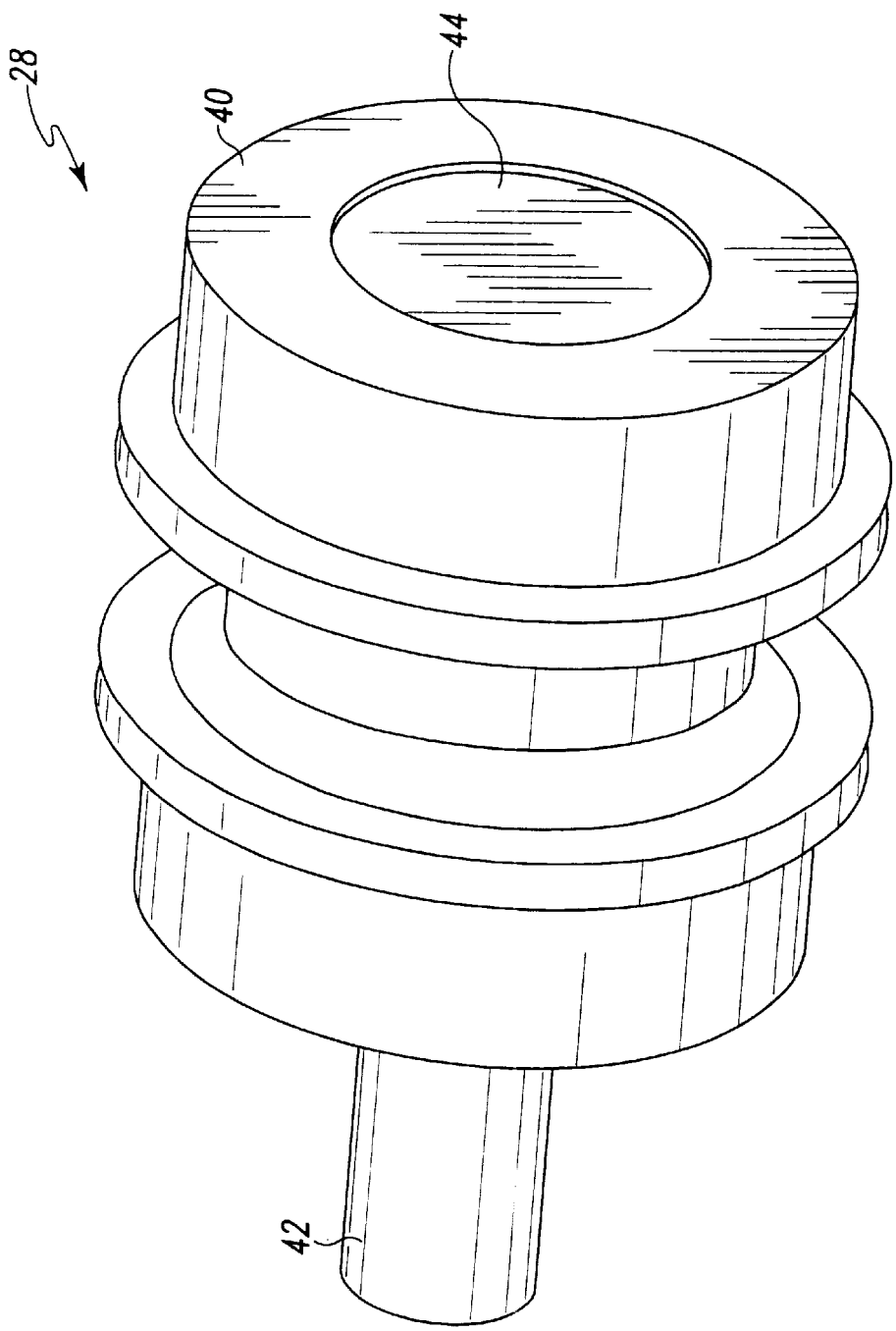
FIG. 2 is an enlarged perspective view of the carrier roller of the tractor of FIG. 1.
Figure 3:
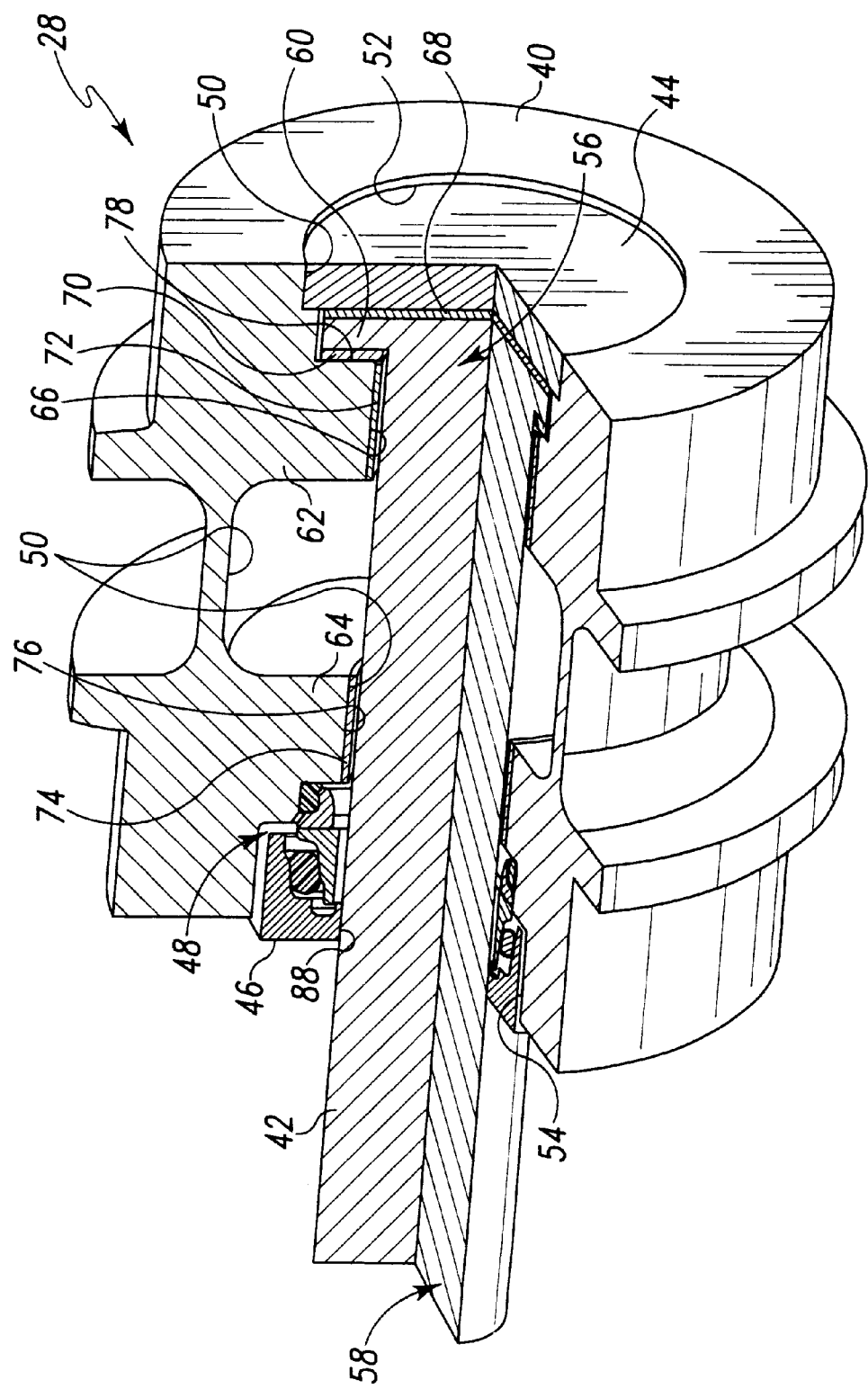
FIG. 3 is a partial cutaway view of the carrier roller of FIG. 2.

Each of the idler wheels 22, 24 and the rollers 26, 28 are designed for low cost and ease of manufacture relative to heretofore designed idler wheels and rollers. For example, as shown in FIGS. 2 and 3, the carrier roller 28 is shown in greater detail. The carrier roller 28 includes a roller rim 40, a roller shaft 42, a retainer 44, a collar 46, and a sealing assembly 48. As shown in FIG. 3, the roller rim 40 has a central passage 50 defined therein. One end of the central passage 50 defines a first access opening 52, whereas the other end of the central passage 50 defines a second access opening 54. As shown in FIG. 3, the retainer 44 is positioned within the first access opening 52, whereas the collar 46 is positioned within the second access opening 54.

The roller shaft 42 is received into the central passage 50 such that one end portion 56 thereof is positioned within the central passage 50, while the opposite end portion 58 of the roller shaft 42 is positioned outside of the central passage 50. It should be appreciated that the end portion 58 of the roller shaft 42 is received into a split collar mechanism or the like (not shown) in order to secure the carrier roller 28 to a frame member (not shown) associated with the track-type tractor 10.

The roller shaft 42 has integrated thrust surfaces which cooperate with a number of bearings to absorb radial and axial thrust forces exerted on the carrier roller 28. In particular, the end portion 56 of the roller shaft 42 which is located in the central passage 50 of the roller rim 40 has an outwardly extending annular flange 60 secured thereto. It should be appreciated that the annular flange 60 may be welded or otherwise secured to the end portion 56 of the roller shaft 42 or may preferably be integrally formed with the roller shaft 42. The annular flange 60 preferably extends continuously around the outer periphery of the roller shaft 42, although the annular flange 60 may alternatively be embodied as a series of individual flange sections which line the outer periphery of the roller shaft 42.

The annular flange 60 is provided to retain the roller shaft 42 in the central passage 50 of the roller rim 40. In particular, the roller rim 40 has a pair of inwardly extending annular flanges 62, 64 defined therein. As shown in FIG. 3, the inwardly extending annular flange 62 defines a flange opening 66 having a diameter which is smaller in size relative to the diameter of the outwardly extending annular flange 60 of the roller shaft 42. Hence, the outwardly extending annular flange 60 is sandwiched or otherwise interposed between the inwardly extending annular flange 62 of the roller rim 40 and the retainer 44.

The carrier roller 28 also includes a number of bearings which function to absorb both radial and axial thrust loads which are exerted on the carrier roller 28. For example, the carrier roller includes an outer axial thrust bushing 68, an inner axial thrust bushing 70, and a pair of radial thrust bushings 72, 74. What is meant herein by the term "bushing" is a plate or sleeve which functions to constrain, guide, or reduce friction. Note that as used herein that the term "bushing" does not include other types of bearing assemblies such roller bearings or tapered roller bearings which include a large number of moving components.

As shown in FIG. 3, the inner axial thrust bushing 70 and the radial thrust bushing 72 are preferably embodied as a single component, but could alternatively be embodied as separate components. The bushings 68, 70, 72, 74 are preferably embodied as metallic plates or sleeves which include a suitable bearing material. One example of a suitable bearing material includes bronze. Hence, the bushings 68, 70, 72, 74 may be embodied as bronze or steel-backed bronze plates or sleeves.

The radial thrust bushings 72, 74 are secured to the roller rim 40. In particular, the inwardly extending annular flanges 62, 64 defined in the roller rim 40 each have an radial face 76 defined therein. The radial thrust bushings 72, 74 are secured in contact with the radial faces 76. One manner of securing the radial thrust bushings 72, 74 to the roller rim 40 is by press fitting the radial thrust bushings 72, 74 onto the radial faces 76 of the inwardly extending annular flanges 62, 64, respectively. It should be appreciated that in the case of when the radial thrust bushing 72 and the inner axial thrust bushing 70 are embodied as an integrated component, the axial thrust bushing 70 would be interposed between an axial face 78 defined in the inwardly extending annular flange 62 and the outwardly extending annular flange 60 of the roller shaft 42 when the radial thrust bushing 72 is press fit to the roller rim 40.

The outer axial thrust bushing 68 is interposed between the retainer 44 and the outwardly extending annular flange 60 of the roller shaft 42. The outer thrust bushing 68 maybe secured to the retainer 44, or the outwardly extending annular flange 60 of the roller shaft 42, or may be allowed to "float" therebetween. In any of these configurations, the retainer 44 retains the axial thrust bushing 68 and the roller shaft 42 in place. In particular, the retainer 44 is press fit into the access opening 52 of the central passage 50 defined in the roller rim 40 thereby retaining the axial thrust bushing 70 in an interposed position between the outwardly extending annular flange 60 of the roller shaft 42 and the retainer 44.

Figure 4:
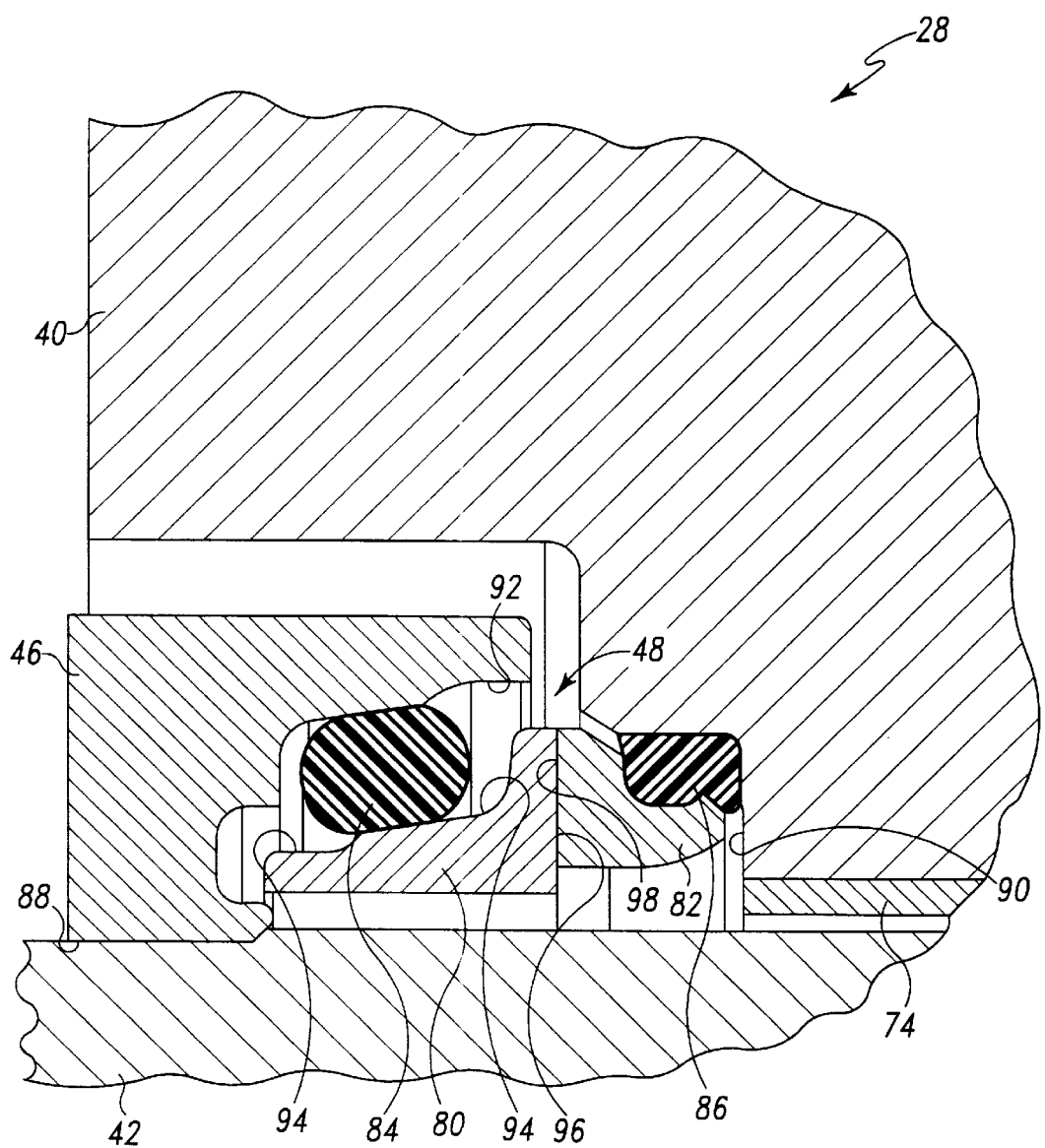
FIG. 4 is an enlarged fragmentary cross sectional view of the seal assembly of the carrier roller of FIG. 3.

As shown in FIGS. 3 and 4, the sealing assembly 48 includes a pair of sealing rings 80, 82, toric sealing member 84, and a static sealing member 86. Each of the sealing rings 80, 82, and sealing members 84, 86 are generally ring-shaped thereby allowing the roller shaft 42 to be advanced through an opening defined therein. The sealing assembly 48 is provided to prevent the ingress of contaminants such as dirt and dust into the central passage 50 of the roller rim 40 while also retaining fluid such as an oil lubricant within the central passage 50. In particular, the inner portion of the central passage 50 is filled with a lubricant such as oil in order to lubricate the internal components associated with the carrier roller 28. The sealing assembly 48 prevents the lubricant from leaking out the access opening 54 of the central passage 50. It should be appreciated that a similar sealing assembly is not needed on the other end of the roller rim 40 due to the press fit arrangement of the retainer 44.

The sealing assembly 48 is held in place by the collar 46. More specifically, the collar 46 is press fit onto the roller shaft 42 through a shaft opening 88 defined in the collar 46 thereby pressing the sealing assembly 48 into the position shown in FIGS. 3 and 4. When the collar 46 is installed in such a manner, the static sealing member 86, being constructed of an elastomeric material such as rubber, is compressed into a recess 90 defined in the roller rim 40 by the sealing ring 82. When compressed in the recess 90, the sealing member 86 is prevented from moving in an axial direction. The toric sealing member on the other hand is positioned in a sealing recess 92 defined in the shaft opening 88 of the collar 46. Moreover, the toric sealing member 84 is configured to move along a ramp 94 defined in the sealing ring 80 in order to allow for the axial or other types of forces exerted on the sealing assembly 48. Similarly to the static sealing member 86, the toric sealing member 84 is constructed of an elastomeric material such as rubber.

Both of the sealing rings 80, 82 have a ring face 96, 98, respectively, defined therein. The ring faces 96, 98 abut each other and are pressed into sealing engagement with each other when the collar 46 is press fitted onto the roller shaft 42. Such an arrangement allows for sealing of the carrier roller 28 when the roller rim 40 is rotated relative to the roller shaft 42. In particular, advancement of the track chain 30 causes the roller rim 40 to rotate relative to the roller shaft 42. During such rotation of the roller rim 40, the sealing ring 82 is also rotated (since it is non-rotatably secured to the roller rim 40) while the sealing ring 80 is held stationary by the collar 46 (which likewise doesn't rotate by way of its press fit to the roller shaft 42). Thus, the configuration of the sealing faces 96, 98 provides for a sealing assembly 48 which maintains an adequate seal while allowing a first portion thereof (i.e. the sealing ring 82 and static sealing member 86) to rotate relative to the a second portion (i.e. the sealing ring 80 and the toric sealing member 84).

It should be appreciated that the above-described configuration of the carrier roller 28 is less mechanically complex relative to heretofore designed roller assemblies. For example, use of the bushings 68, 70, 72, 74 eliminates the need for mechanically complex roller bearing assemblies often found in heretofore designed carrier rollers. Moreover, the above-described configuration of the carrier roller 28 provides a design which can be manufactured in a relatively simplified fabrication process. In particular, the roller rim 40 is initially produced as either a single piece or may be provided as two symmetric halves which are welded or otherwise secured to one another. Likewise, the roller shaft 42 is produced as either a single piece, or alternatively, the shaft 42 may be produced separate from the outwardly extending annular flange 60 with the two pieces being welded or otherwise secured to one another.

Thereafter, the radial thrust bushing 74 is press fit onto the radial face 76 of the inwardly extending annular flange 64. Moreover, the assembly of the radial thrust bushing 72 and the axial thrust bushing 70 is then press fit onto the radial face 76 and the axial face 78, respectively, of the inwardly extending annular flange 62. The end portion 58 of the roller shaft 42 is then advanced through the access opening 52, through the central portion of the central passage 50, and out the access opening 54 such that the outwardly extending annular flange 60 contacts the inner axial thrust bushing 70.

Thereafter, the outer axial bushing 68 is advanced through the access opening 52 and into contact with the outwardly extending annular flange 60 of the roller shaft 42. The retainer 44 is then press fit into the access opening 52 thereby retaining the roller shaft 42 and the outer axial thrust bushing 68 in the central passage 50 of the roller rim 40.

The sealing assembly 48 is then slid along the end portion 58 of the roller shaft 42 so as to be advanced through the access opening 54. Thereafter, the collar 46 is press fit onto the roller shaft 42 so as to secure the sealing assembly 48 into the position shown in FIGS. 3 and 4. Once assembled in the manner described, a lubricant is added to the interior portion of the roller rim 40 and the carrier roller 28 is secured to the undercarriage assembly 16 of the track-type tractor 10.

Figure 5:
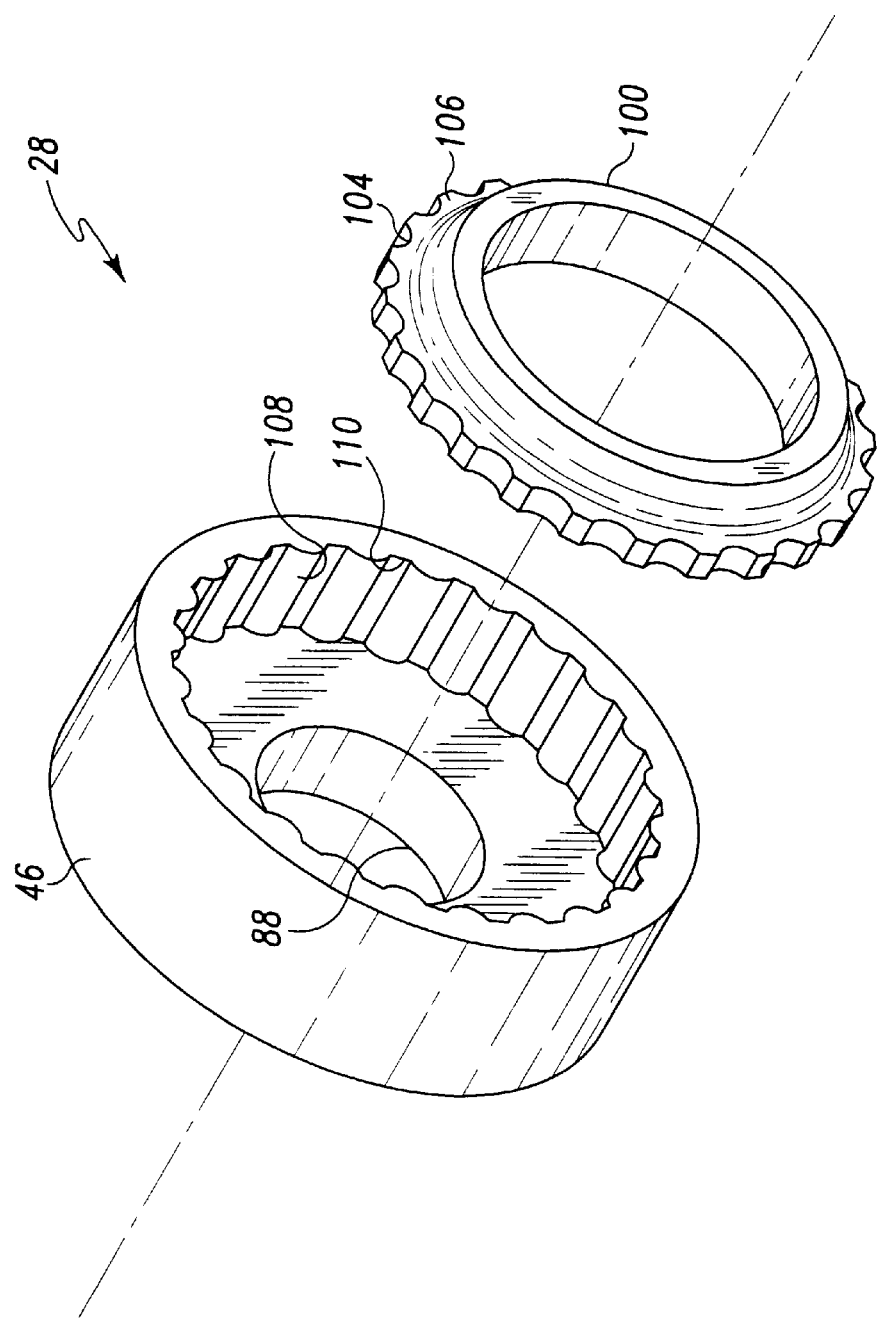
FIG. 5 is an exploded perspective view showing an alternative embodiment of the seal assembly of FIG. 4.
Figure 6:
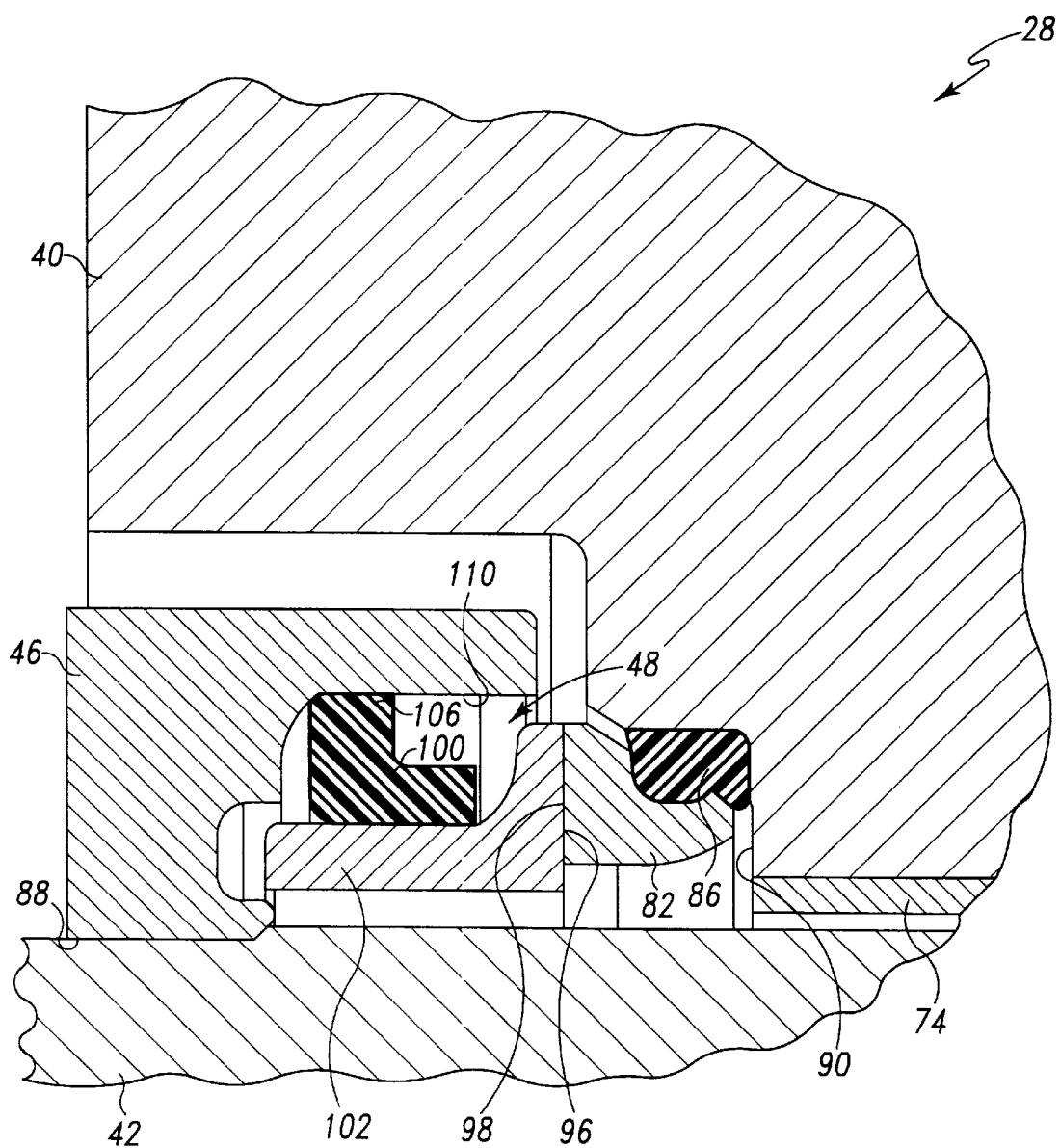
FIG. 6 is a view similar to FIG. 4, but showing the alternative embodiment of the seal assembly of FIG. 5.

As shown in FIGS. 5 and 6, the sealing assembly 48 and the collar 46 may be modified to fit the needs of a given roller configuration. In particular, the sealing assembly 48 may be embodied to include an elastomeric splined sealing member 100 in lieu of the toric sealing member 84 and a sealing ring 102 in lieu of the sealing ring 80. The splined sealing member 100 is secured around the outer periphery of the sealing ring 102 in a similar manner as the toric sealing member 84 is secured to the outer periphery of the sealing ring 80. The outer peripheral edge 104 of the splined sealing member 100 has a number of splines 106 defined therein. When assembled, the splines 106 engage or otherwise contact a similar number of splines 108 defined in an inner peripheral surface 110 of the collar 46. It should be appreciated that such an arrangement further prevents the sealing ring 102 and/or the splined sealing member 100 from rotating or otherwise moving relative to the collar 46.

Figure 8:
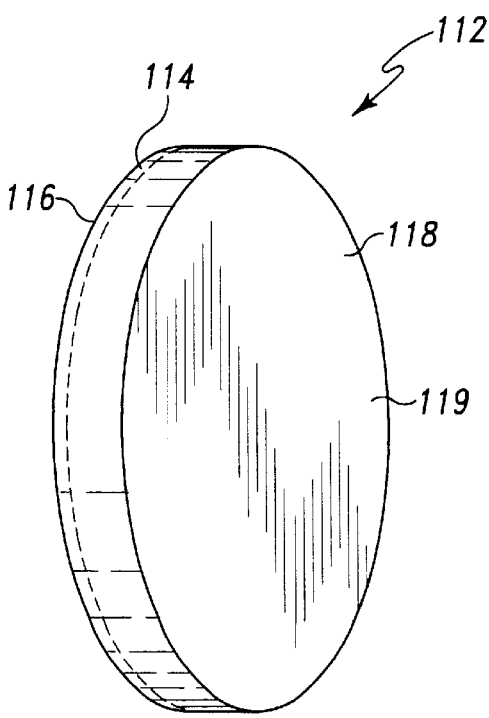
FIG. 8 is a perspective view of the integrated retainer and thrust bushing manufactured by the process shown in FIG. 7.

The metallic components described herein may be fabricated using numerous known techniques such as forging or casting. Moreover, the metallic components described herein may also be fabricated using powder metallurgy. Use of powder metallurgy provides a number of benefits in regard to fabrication of the carrier roller 28. For example, certain of the components associated with the carrier roller 28 may be integrated into a single component by use of powder metallurgy techniques. For instance, as shown in FIG. 8, an integrated retainer and thrust bushing 112 may be fabricated which may be utilized in lieu of the retainer 44 and the outer axial thrust bushing 68 of FIG. 3. As its name implies, the integrated retainer and thrust bushing 112 includes a bushing portion 114 which is defined in a first face or side 116 thereof and a retainer portion 118 which is defined in a second face or side 119 thereof. The bushing portion 114 of the integrated retainer and thrust bushing 112 is constructed of bearing material such as bronze, whereas as the retainer portion 118 of the integrated retainer and thrust bushing 112 is constructed of steel.

It should be appreciated that once assembled into the roller rim 40 of the carrier roller 28, the bushing portion 114 of the integrated retainer and thrust bushing 112 is positioned in contact with the roller shaft 42. In particular, during assembly of the carrier roller 28, the integrated retainer and thrust bushing 112 is press fit into the access opening 52 such that the first face 116 thereof is pressed into contact with or proximate to the end face of the outwardly extending annular flange 60. In such a manner, the outwardly extending annular flange 60 of the roller shaft 42 bears on the integrated bushing portion 114 thereby allowing for absorption of axial thrusts exerted on the carrier roller 28 during operation of the track-type tractor 10.

Figure 7:
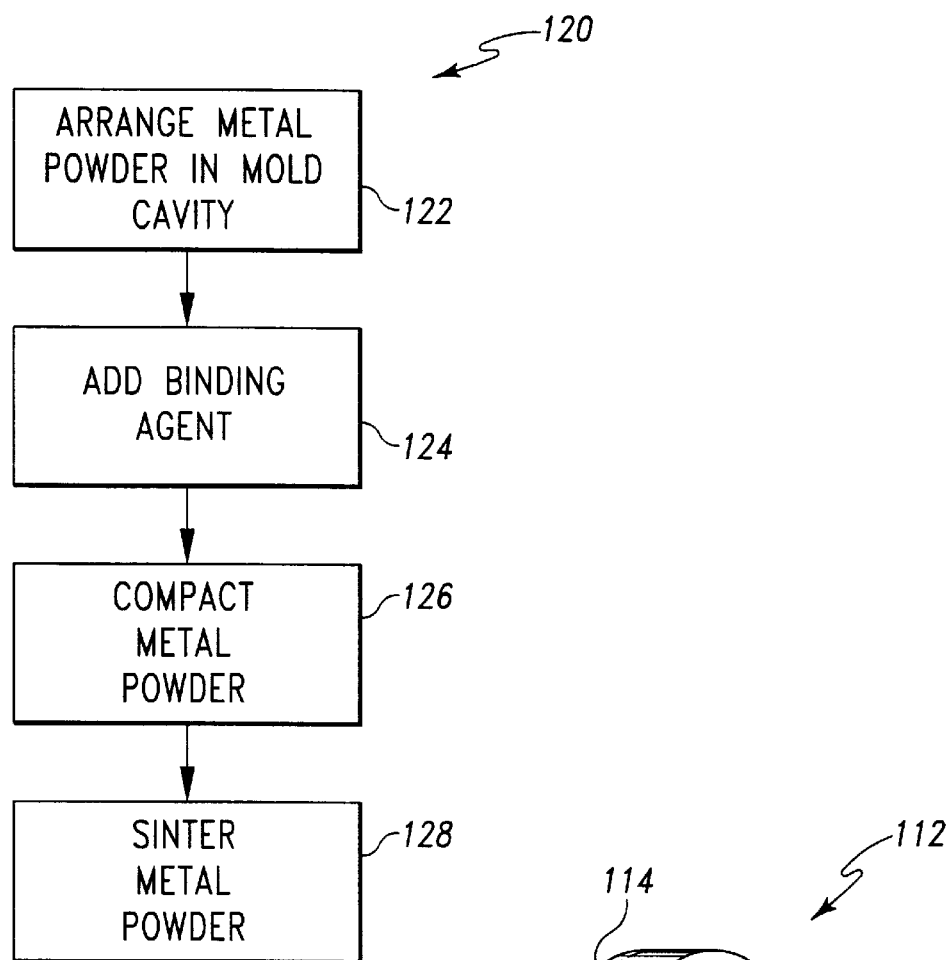
FIG. 7 is a flowchart of a process which is utilized to manufacture an integrated retainer and thrust bushing for use in the carrier roller of FIG. 2.

Referring now to FIG. 7, there is shown a flowchart of a manufacturing process 120 for fabricating the integrated retainer and thrust bushing 112 of FIG. 8. The process 120 begins with step 122 in which the differing types of metal powder are arranged in predetermined locations in a mold cavity. In particular, a first type of metal powder such as metal powder containing bronze is positioned in a location within a mold cavity which corresponds to the front or bushing portion 114 of the integrated retainer and thrust bushing 112, whereas a second type of metal powder such as metal powder containing iron and graphite is positioned in a location within the mold cavity which corresponds to the rear or retainer portion 118 of the integrated retainer and thrust bushing 112. It should be appreciated that such positioning of the different types of metal powders corresponds to the desired orientation of the integrated retainer and thrust bushing 112 shown in FIG. 8 in which the bronze or other type of bearing material is formed in the bushing portion 114, and steel or other type of reinforcing material is formed in the retainer portion 118.

Next, in step 124, a binding agent is added to the metal powders in the mold cavity. The binding agent may be of any type of known binding agents which are commonly utilized in powder metallurgy. Thereafter, the metal powders within the mold cavity are compacted (step 126) and thereafter sintered (step 128) in order to produce the desired integrated retainer and thrust bushing 112. Thereafter, the integrated retainer and thrust bushing 112 is press fit into the access opening 52 of the roller rim 40 in the manner discussed above.

Hence, as described herein, use of powder metallurgy techniques in the fabrication of the integrated retainer and thrust bushing 112 allows for further component reduction by allowing the retainer 44 and the outer axial thrust bushing 68 of FIG. 3 to be constructed as a single component. Such component reduction reduces costs associated with manufacture of the carrier roller 28 along with further simplifying the assembly process of the carrier roller 28.

Moreover, it should be appreciated the integrated retainer and thrust bushing 112 may be constructed in a number of different manners. For example, the retainer portion 118 may first be fabricated by use of a technique other than powder metallurgy with the bushing portion 114 then being sintered thereto in the manner described above. For example, the retainer portion 118 may first be fabricated by use of a forging or casting technique. Thereafter, the bushing portion 114 may be formed and sintered to the forged or cast retainer portion 118 by use of a powder metallurgy technique similar to the one described above.

Figure 10:
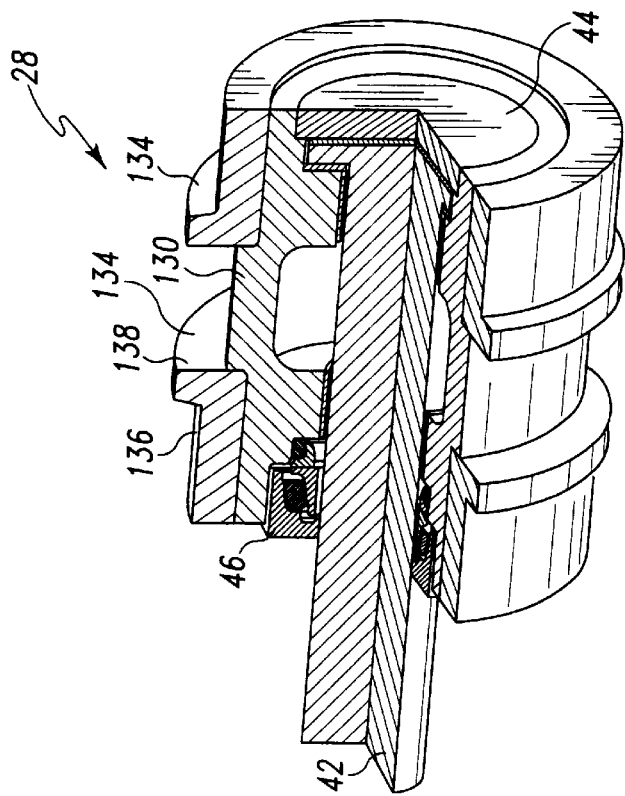
FIGS. 9 and 10 are perspective views which show an alternative embodiment of the carrier roller of FIG. 2.
Figure 9:
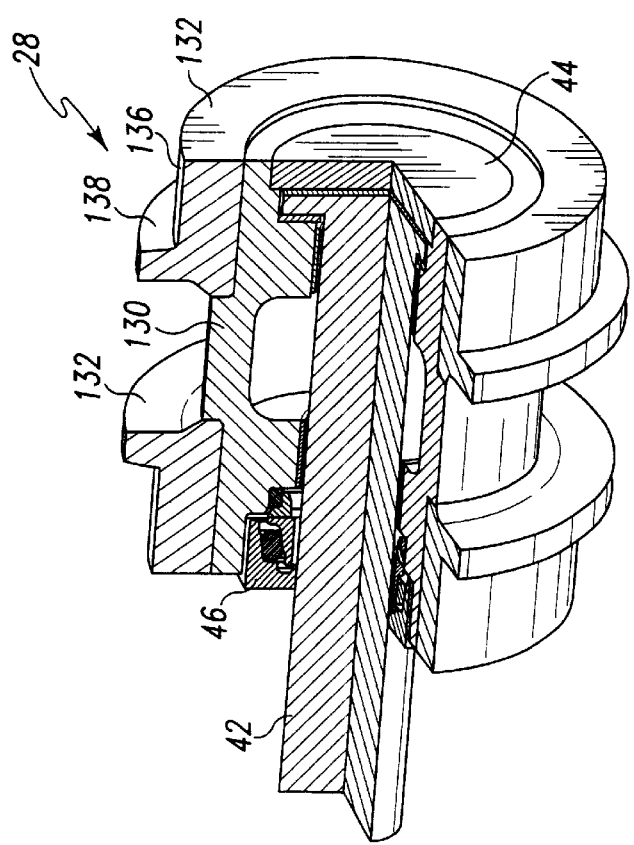

Referring now to FIGS. 9 and 10, there is shown yet another alternative configuration of the carrier roller 28. The carrier roller 28 shown in FIGS. 9 and 10 is substantially the same as the carrier roller shown in FIGS. 2–4. Accordingly, similar reference numerals have been utilized to designate similar components. As shown in FIGS. 9 and 10, the carrier roller 28 is configured to include a roller hub 130 and rim portions 132, 134 in lieu of the roller rim 40. Such a configuration allows carrier rollers 28 of varying sizes to be constructed from the same "core" thereby allowing for greater flexibility and component commonization in the manufacture of track-type tractors of varying sizes.

The components associated with the carrier roller 28 are assembled to the roller hub 130 in an identical manner to that in which such components are assembled to the roller rim 40 of FIGS. 2–4 (as described above). Accordingly, a detailed description of the assembly process is not warranted. Thereafter, rim portions of varying sizes may be press fit onto the roller hub 130 in order to produce carrier rollers 28 of varying sizes. For example, the rim portion 132, having a relatively large outer diameter, may be press fit onto the roller hub 130 in order to produce a carrier roller 28 which has a relatively large outer diameter. Alternatively, the rim portion 134, having a smaller outer diameter (relative to the rim portion 132), may be press fit onto the roller hub 130 in order to produce a carrier roller 28 which has a smaller outer diameter (relative to a carrier roller 28 assembled with the rim portion 132).

It should be appreciated that such varying rim sizes are useful for guiding and/or supporting drive track chains 30 of varying sizes. For example, each of the rim portions 132, 134 has a base 136 with an annular flange 138 extending therefrom. The annular flanges 138 of the roller rim 132 extend a greater distance from the base 136 than do the annular flanges 138 of the roller rim 134 from the base 136 thereby creating a larger outer diameter in regard to a carrier roller 28 assembled with the rim portion 132 relative to a carrier roller 28 assembled with the rim portion 134. It should be appreciated that any number of different rim portions may be designed to install on the roller hub 130 thereby creating numerous different carrier roller sizes and configurations.

Moreover, although it is herein described to press fit the rim portions 132, 134 onto the roller hub 130 after assembly of the other roller components (e.g. the roller shaft 42, retainer 44, etcetera), it should be appreciated that other assembly configurations are also contemplated. For example, a rim portion such as the rim portion 132, 134 may be press fit onto the roller hub 130 prior to assembly of the other components (e.g. the roller shaft 42, retainer 44, etcetera) onto the roller hub 130.

The concepts discussed above in regard to the carrier roller 28 are also useful in the construction of other types of undercarriage components. For example, as shown in FIGS. 11–14, the concepts discussed above in regard to the carrier roller 28 may also be utilized in the construction of the track rollers 26 or the idler wheels 22, 24. It should be appreciated that certain of the components associated with the track rollers 26 and the idler wheels 22, 24 are identical to the components associated with the carrier roller 28. Accordingly, the same reference numerals have been utilized herein to denote similar components and additional description of such similar components is not warranted.

Figure 11:
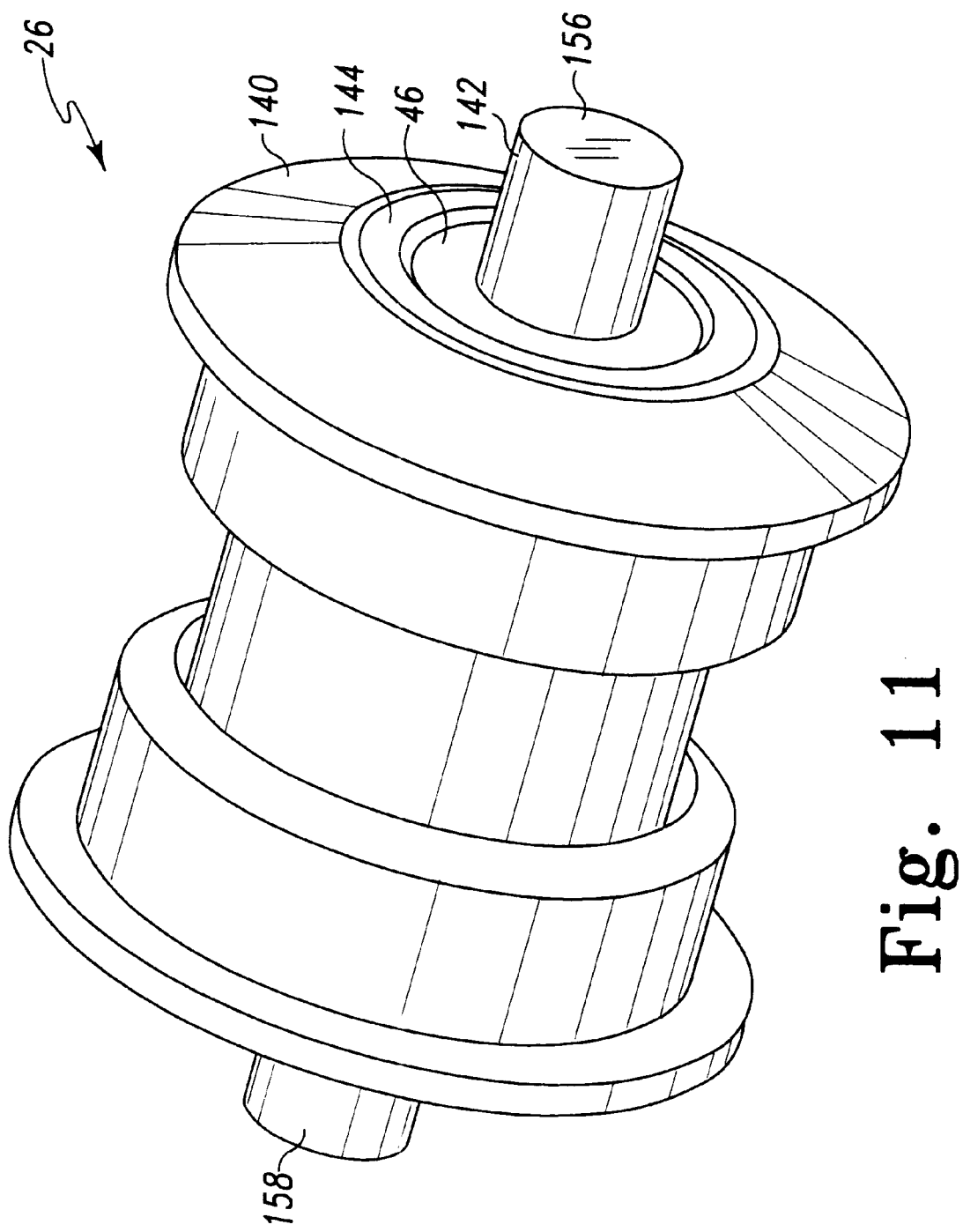
FIG. 11 is an enlarged perspective view of one of the lower track rollers of the tractor of FIG. 1.
Figure 12:
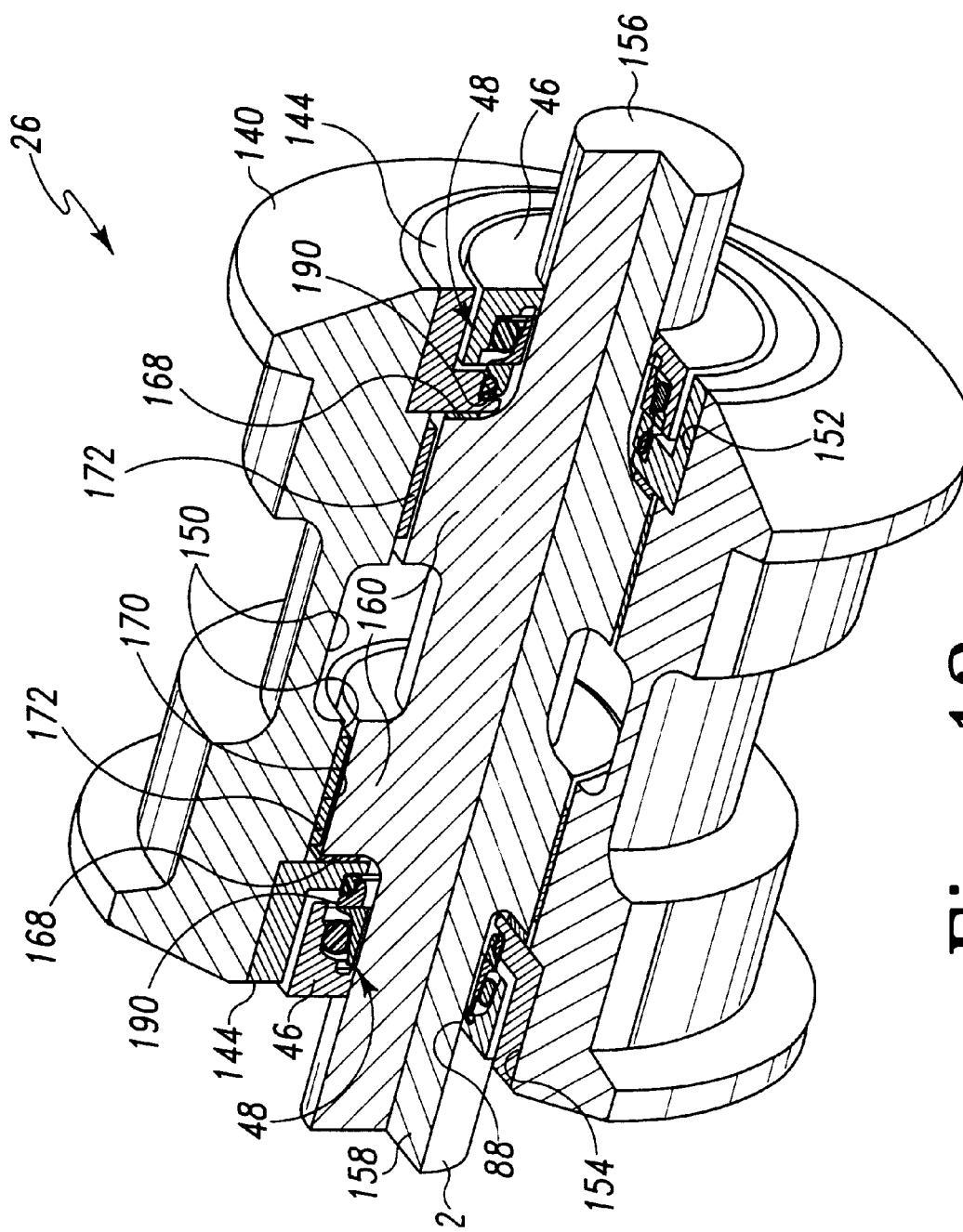
FIG. 12 is a partial cutaway view of the track roller of FIG. 11.

Referring now to FIGS. 11 and 12, there is shown one of the track rollers 26 in greater detail. The track roller 26 includes a roller rim 140, a roller shaft 142, a pair of retainers 144, a pair of collars 46, and a pair of sealing assemblies 48. As shown in FIG. 12, the roller rim 140 has a central passage 150 defined therein. One end of the central passage 150 defines a first access opening 152, whereas the other end of the central passage 150 defines a second access opening 154. As shown in FIG. 12, an assembly including one of the sealing assemblies 48, one of the retainers 144, and one of the collars 46 is positioned in each of the access openings 152, 154.

The roller shaft 142 is received into the central passage 150 such that one end portion 156 thereof extends out of the first access opening 152 of the central passage 150, while the opposite end portion 158 of the roller shaft 142 extends out of the second access opening 154 of the central passage 50. It should be appreciated that the end portions 156, 158 of the roller shaft 142 are received into a retaining mechanism or the like (not shown) in order to secure the track roller 26 to the undercarriage assembly 16 of the track-type tractor 10.

Similarly to the roller shaft 42, the roller shaft 142 has integrated thrust surfaces which cooperate with a number of bearings to absorb radial and axial thrust forces exerted on the track roller 26. In particular, the roller shaft 142 has a pair of outwardly extending annular flanges 160 secured thereto. It should be appreciated that the annular flanges 160 may be welded or otherwise secured to the roller shaft 142 or may preferably be integrally formed with the roller shaft 142. The annular flanges 160 preferably extend continuously around the outer periphery of the roller shaft 142, although the annular flanges 160 may alternatively be embodied as a series of individual flange sections which line the outer periphery of the roller shaft 142.

The track roller 26 also includes a number of bearings which function to absorb both the radial and axial thrust loads which are exerted on the track roller 26. For example, the track roller 26 includes a pair of axial thrust bushings 168 and a pair of radial thrust bushings 172. As with the bushings 68, 70, 72, 74, the bushings 168, 172 are preferably embodied as metallic plates or sleeves which include a suitable bearing material such as bronze or steel-backed bronze plates or sleeves. As shown in FIG. 12, the axial thrust bushings 168 and the radial thrust bushings 172 are preferably embodied as separate components; however, the axial thrust bushings 168 and the radial thrust bushings 172 could alternatively be embodied as a single component (similar to the integrated inner axial bushing 70 and the radial bushing 72 if FIG. 3).

As with the radial thrust bushings 72, 74 of the carrier roller 28, the radial thrust bushings 172 are secured to the roller rim 140. In particular, the radial thrust bushings 172 are secured to an inner sidewall 170 defined in the roller rim 140. One manner of securing the radial thrust bushings 172 to the roller rim 140 is by press fitting the radial thrust bushings 172 onto the sidewall 170 of the roller rim 140.

The retainers 144 retain the axial thrust bushing 168 and the roller shaft 142 in place. In particular, one of the retainers 144 is press fit into each of the access openings 152, 154 of the central passage 150 defined in the roller rim 140 thereby retaining the axial thrust bushing 168 and the outwardly extending annular flanges 160 of the roller shaft 142 within the central passage 150 of the roller rim 140. Hence, the axial thrust bushing 168 is interposed between the outwardly extending annular flanges 160 of the roller shaft 142 and the retainers 144 when the retainers 144 are press fit onto the roller rim 140.

Similarly to as described above in regard to the carrier roller 26, the sealing assemblies 48 are provided to prevent the ingress of contaminants such as dirt and dust into the central passage 150 of the roller rim 140 while also retaining fluid such as an oil lubricant within the central passage 150. In particular, the inner portion of the central passage 150 is filled with a lubricant such as oil in order to lubricate the internal components associated with the track roller 26. The sealing assemblies 48 prevent the lubricant from leaking out the access openings 152, 154 of the central passage 150. In particular, as shown in FIG. 12, the sealing assemblies 48 are interposed between the retainers 144 and the collars 48. Moreover, the sealing assemblies 48 are held in place by the collars 46. For example, similarly to the carrier roller 28, the collar 46 is press fit onto the roller shaft 142 through the shaft opening 88 defined in the collar 46 thereby pressing the sealing assembly 48 into the position shown in FIG. 12.

When the collar 46 is installed in such a manner, the static sealing member 86, being constructed of an elastomeric material such as rubber, is compressed into a recess 190 defined in each of the retainers 144 by the sealing ring 82. When compressed in the recess 190, the sealing member 86 is prevented from moving in an axial direction. The toric sealing member 84 on the other hand is positioned in the sealing recess 92 defined in the shaft opening 88 of the collar 46. As described above, the toric sealing member 84 is configured to move along a ramp 94 defined in the sealing ring 80 (see FIG. 4) in order to accommodate axial forces or movement exerted on the sealing assembly 48.

As described above, the ring faces 96, 98 abut each other and are pressed into sealing engagement with each other when the collar 46 is press fitted onto the roller shaft 142. Such an arrangement allows for sealing of the track roller 26 when the roller rim 140 is rotated relative to the roller shaft 142. In particular, advancement of the track chain 30 causes the roller rim 140 to rotate relative to the roller shaft 142. During such rotation of the roller rim 140, the sealing ring 82 is also rotated (since it is non-rotatably secured to the retainer 144 and hence the roller rim 140) while the sealing ring 80 is held stationary by the collar 46 (which likewise doesn't rotate by way of its press fit to the roller shaft 142). Thus, as described above, the configuration of the sealing faces 96, 98 provides for a sealing assembly 48 which maintains an adequate seal while allowing a first portion thereof (i.e. the sealing ring 82 and static sealing member 86) to rotate relative to the a second portion (i.e. the sealing ring 80 and the toric sealing member 84).

It should be appreciated that the above-described configuration of the track roller 26 is less mechanically complex relative to heretofore designed track roller assemblies. For example, use of the bushings 168, 172 eliminates the need for the mechanically complex bearing assemblies often found in heretofore designed track rollers. Moreover, the above-described configuration of the track roller 26 provides a design which can be manufactured in a relatively simplified fabrication process. In particular, the roller rim 140 is initially produced as either a single piece or may be provided as two symmetric halves which are welded or otherwise secured to one another. Likewise, the roller shaft 142 is produced as either a single piece, or alternatively, the shaft 142 may be produced separate from the outwardly extending annular flanges 160 with the two pieces being welded or otherwise secured to one another.

In any event, the radial thrust bushings 172 are first press fit onto the sidewall 170 of the roller rim 140. The roller shaft 142 is then positioned in the central passage 150 of the roller rim 140 such that the end portion 156 thereof extends out the access opening 152 of the central passage 150 defined in the roller rim 140 and the end portion 158 thereof extends out the access opening 154. Thereafter, the axial bushings 168 are advanced through the access openings 152, 154 and into contact with the outwardly extending annular flanges 60 of the roller shaft 142. The retainers 144 are then press fit into the access openings 152, 154 thereby retaining the roller shaft 42 and the axial thrust bushings 168 in their respective locations shown in FIG. 12.

The sealing assemblies 48 are then slid along the end portions 156, 158 of the roller shaft 142 so as to be advanced through the access openings 152, 154. Thereafter, the collars 46 are press fit onto the roller shaft 142 so as to secure the sealing assemblies 48 into the position shown in FIG. 12. Once assembled in the manner described, a lubricant is added to the interior portion of the roller rim 140 and the track roller 26 is then secured to the undercarriage assembly 16 of the track-type tractor 10.

Hence, as described, the configuration of the track roller 26 provides for relative ease of manufacture compared to heretofore designed track rollers. Moreover, the configuration of the track roller 26 is less mechanically complex relative to heretofore designed track rollers thereby reducing component cost relative to such previous designs.

Figure 13:
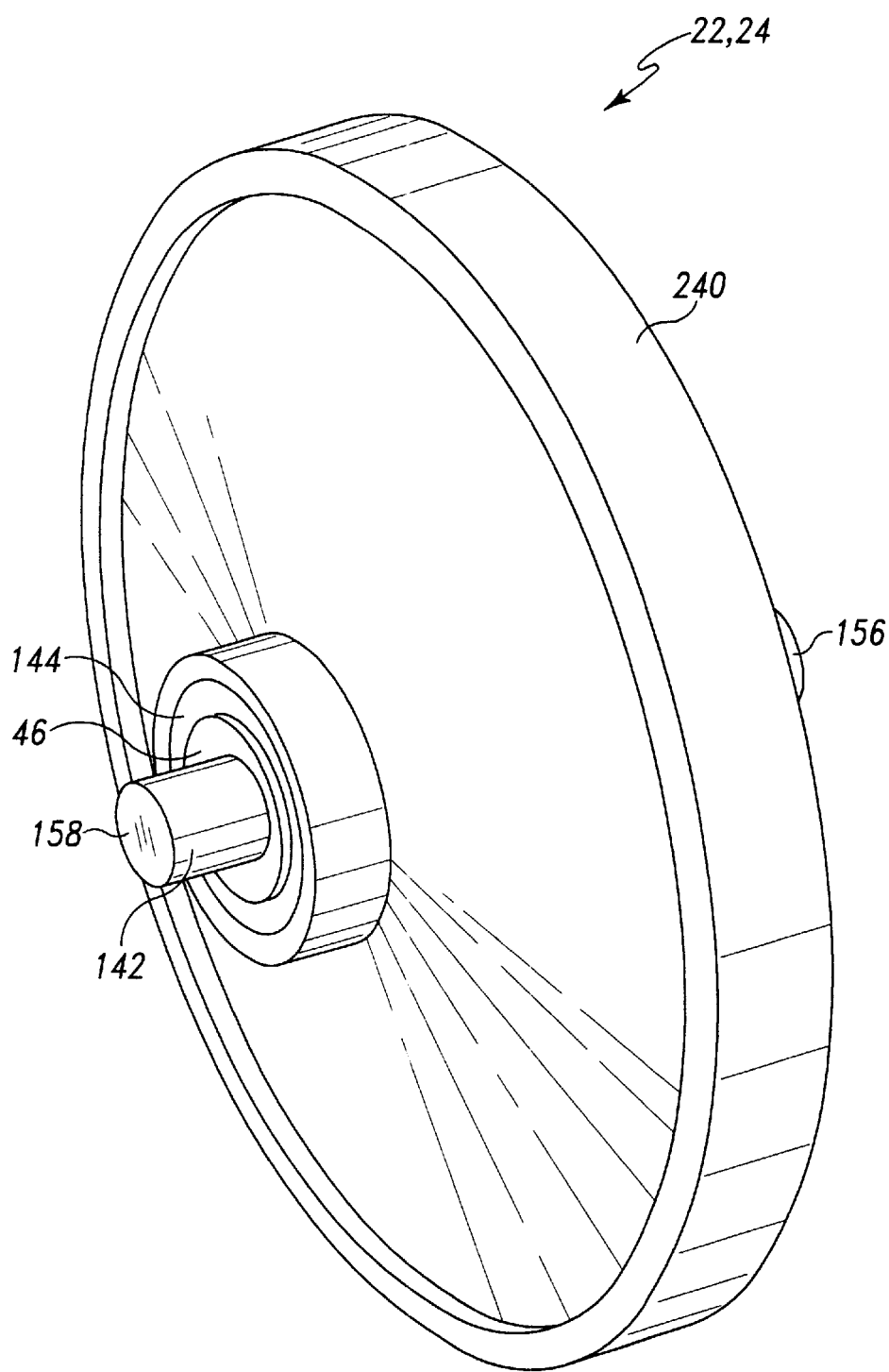
FIG. 13 is an enlarged perspective view of one of the idler wheels of the tractor of FIG. 1.
Figure 14:
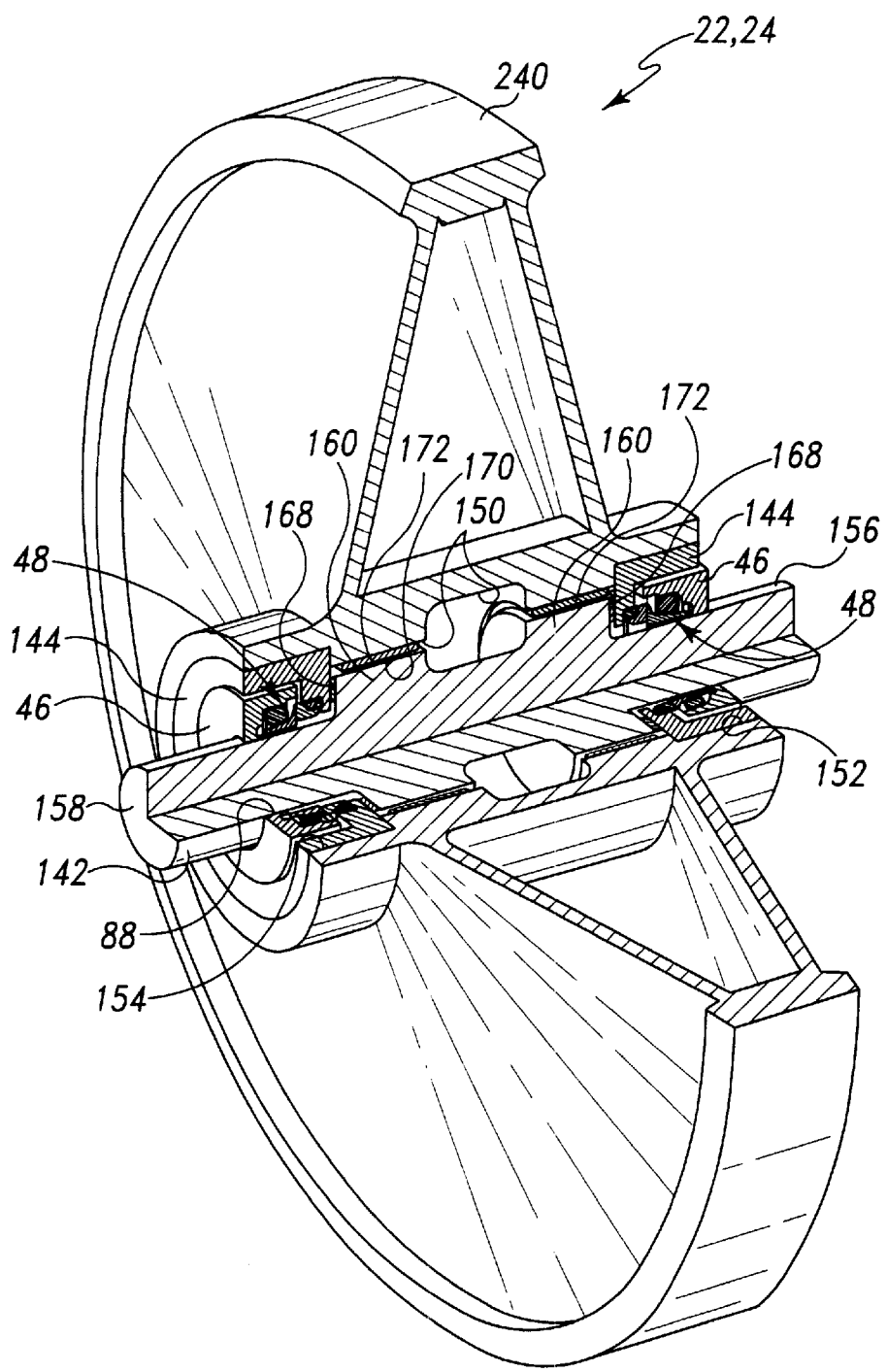
FIG. 14 is a partial cutaway view of the idler wheel of FIG. 13.

As shown in FIGS. 13 and 14, the "core" of the track roller 26 may also be utilized in the construction of the idler rollers 22, 24. In particular, as shown in FIGS. 13 and 14, with the exception of use of an idler rim 240 in lieu of the roller rim 140, the idler wheels 22, 24 are substantially the same as the track rollers 26. Accordingly, common reference numerals have be utilized to designate components which are common between the track roller 26 and the idler wheels 22, 24. Hence, the discussion relating to the components and construction of the track rollers 26 is relevant to the components and construction of the idler wheels 22, 24.

Moreover, it should be appreciated that certain of the alternative embodiments discussed above in regard to the carrier roller 28 also may be utilized in conjunction with the track rollers 26 and the idler wheels 22, 24. For example, in order to prevent the sealing ring 80 or the toric sealing member 84 from rotating or otherwise moving relative to the collar 46 of the track roller 26 or the idler wheels 22, 24, the sealing assemblies 48 thereof may be embodied to include the elastomeric splined sealing member 100 in lieu of the toric sealing member 84 and a sealing ring 102 in lieu of the sealing ring 80 (see FIGS. 5 and 6).

In addition, certain of the components associated with the track roller 26 or the idler wheels 22, 24 may be integrated into a single component by use of powder metallurgy techniques. For instance, similarly to the integrated retainer and thrust bushing 112 shown in FIG. 8, an integrated retainer and thrust bushing may be fabricated which may be utilized in lieu of the retainer 144 and the axial thrust bushing 168. As its name implies, such an integrated retainer and thrust bushing would include a bushing portion which is defined in a face thereof which is adjacent to the outwardly extending flanges 160 of the roller shaft 142 and a retainer portion. As with the integrated retainer and thrust bushing 112, the bushing portion is constructed of bearing material such as bronze, whereas as the retainer portion is constructed of steel.

INDUSTRIAL APPLICABILITY

In operation, the track-type tractor 10 of FIG. 1 may be utilized to perform a large number of work functions such as earth moving and ripping. In doing so, the endless drive track chain 30 is driven by the drive sprocket 20 so as to be advanced around each of the front idler wheel 22, the rear idler wheel 24, the track rollers 26, and the carrier roller 28 thereby providing the motive power for the track-type tractor 10. During such operation of the track-type tractor 10, the idler wheels 22, 24 function to exert tension on the drive track chain 30 thereby keeping the drive track chain from derailing during advancement of the track-type tractor 10. Moreover, during such advancement of the track-type tractor 10, the track rollers 26 guide the drive track chain 30 and provide support to the track-type tractor 10. The carrier roller 28 on the other hand, is provided to support an upper or return portion 38 of the drive track chain 30 as it is advanced between the front idler wheel 22 and the drive sprocket 20.

Each of the idler wheels 22, 24 and the rollers 26, 28 are designed for low cost and ease of manufacture relative to heretofore designed idler wheels and rollers since the components associated therewith are entirely assembled using press fits thereby eliminating the need for bolts or other types of fasteners. Moreover, the idler wheels 22, 24 and the rollers 26, 28 are constructed using less mechanically complex components relative to heretofore designed undercarriage components thereby reducing costs associated with manufacture thereof.

Other aspects, objects, and advantages of this invention can be obtained from a study of the drawings, the disclosure, and the appended claims.

What is claimed is:

1. A roller assembly for an undercarriage of a work machine, comprising:

a roller rim having central passage defined therein with (i) a first end of said central passage of said roller rim defining a first access opening, and (ii) a second end of said central passage of said roller rim defining a second access opening;

a roller shaft having a first end portion which is positioned outside of said central passage of said roller rim and a second end portion which is positioned within said central passage of said roller rim, said second end portion of said roller shaft having an outwardly extending annular flange secured thereto;

a retainer press fit into said second access opening;

an axial thrust bearing interposed between said outwardly extending annular flange of said roller shaft and said retainer;

a collar positioned in said first access opening, said collar has a shaft opening defined therein, said first end portion of said roller shaft extends out of said shaft opening of said collar; and said collar being press fit onto said roller shaft.

2. The roller assembly of claim 1, wherein:

said roller rim has an inwardly extending annular flange defined therein which extends into said central passage so as to define a flange opening having a first diameter, said outwardly extending annular flange of said roller shaft has a second diameter, and said second diameter is greater than said first diameter.

3. The roller assembly of claim 2, further comprising a radial thrust bearing, wherein:

said inwardly extending annular flange of said roller rim has a radial face defined therein, and said radial thrust bearing is press fit onto said radial face of said inwardly extending annular flange such that said radial thrust bearing is interposed between said roller shaft and said radial face of said inwardly extending annular flange of said roller rim.

4. The roller assembly of claim 3, wherein:

said roller shaft includes a central portion positioned within said central passage of said roller rim, said central portion of said roller shaft has a third diameter, said second diameter is greater than said third diameter, and said radial thrust bearing is interposed between said central portion of said roller shaft and said radial face of said inwardly extending annular flange of said roller rim.

5. The roller assembly of claim 4, further comprising a collar positioned in said first access opening, wherein said collar is press fit onto said central portion of said roller shaft.

6. The roller assembly of claim 1, wherein said axial thrust bearing includes a metallic bushing.

7. A method of manufacturing a roller assembly for an undercarriage assembly of a work machine, with said roller assembly having (i) a roller rim which has central passage defined therein, with a first end of said central passage of said roller rim defining a first access opening and a second end of said central passage of said roller rim defining a second access opening, (ii) a roller shaft having a first end portion and a second end portion, said second end portion having an outwardly extending annular flange secured thereto, (iii) a retainer, and (iv) a thrust bearing, comprising the steps of:

advancing said first end portion of said roller shaft through said second access opening of said central passage and out said first access opening of said central passage such that (i) said first end portion of said roller shaft extends out of said first access opening of said central passage, and (ii) said second end portion of said roller shaft is positioned in said central passage;

advancing said thrust bearing through said second access opening;

press fitting said retainer into said second access opening such that said thrust bearing is interposed between said retainer and said outwardly extending annular flange of said roller shaft;

providing a collar having a shaft opening defined therein;

positioning said collar in said first access opening such that said first end portion of said roller shaft extends out of said shaft opening of said collar; and press fitting said collar onto said roller shaft.

8. The method of claim 7, wherein:

said roller rim has an inwardly extending annular flange defined therein which extends into said central passage so as to define a flange opening having a first diameter, said outwardly extending annular flange of said roller shaft has a second diameter, said second diameter is greater than said first diameter, and said step of press fitting said retainer into said second access opening includes the step of press fitting said retainer into said second access opening such that said outwardly extending annular flange is interposed between said retainer and said inwardly extending annular flange of said roller rim.

9. The method of claim 8, wherein (i) said roller assembly further has a radial thrust bearing, and (ii) said inwardly extending annular flange of said roller rim has a radial face defined therein, further comprising the steps of:

press fitting said radial thrust bearing onto said radial face of said inwardly extending annular flange such that said radial thrust bearing is interposed between said roller shaft and said radial face of said inwardly extending annular flange of said roller rim.

10. A roller assembly for an undercarriage of a work machine, comprising:

a roller rim having a central passage defined therein with (i) a first end of said central passage of said roller rim defining a first access opening, and (ii) a second end of said central passage of said roller rim defining a second access opening;

a roller shaft positioned in said central passage, said roller shaft having a first end portion which extends out of said first access opening of said central passage and a second end portion which extends out of said second access opening of said central passage;

a first retainer press fit into said first access opening of said roller rim;

a first collar press fit onto said first end portion of said roller shaft; and a first seal assembly interposed between said first retainer and said first collar.

11. The roller assembly of claim 10, further comprising:

a second retainer press fit into said second access opening;

a second collar press fit onto said second end portion of said roller shaft; and a second seal assembly interposed between said second retainer and said second collar.

12. The roller assembly of claim 10, further comprising an axial thrust bearing, wherein:

said roller shaft has an outwardly extending annular flange secured thereto, said outwardly extending annular flange is positioned within said central passage of said roller rim, and said axial thrust bearing is interposed between said outwardly extending annular flange of said roller shaft and said retainer.

13. The roller assembly of claim 12, wherein said axial thrust bearing includes a metallic bushing.

14. The roller assembly of claim 10, further comprising a radial thrust bearing, wherein:

said roller rim has a radial face defined therein, and said radial thrust bearing is press fit onto said radial face of said roller rim such that said radial thrust bearing is interposed between said roller shaft and said radial face of said roller rim.

15. The roller assembly of claim 10, wherein said roller rim includes a track roller rim which is configured to support a drive track chain of said work machine.

16. The roller assembly of claim 10, wherein said roller rim includes an idler roller rim which is configured to exert tension on a drive track chain of said work machine.

* * * * *